United States Patent [19]

Ohlinger et al.

[11] 4,084,936

[45] Apr. 18, 1978

[54] REDUCING CORROSION IN REACTORS USED FOR THE SYNTHESIS OF CHROMIUM DIOXIDE

[75] Inventors: Manfred Ohlinger, Frankenthal; Gerhard Wagner, Ludwigshafen; Gerhard Honecker, Ludwigshafen; Heinz Stritzinger, Ludwigshafen; Heinz Spaehn, Ludwigshafen, all of Germany

[73] Assignee: BASF Aktiengesellschaft, Ludwigshafen, Germany

[21] Appl. No.: 702,980

[22] Filed: Jul. 6, 1976

[30] Foreign Application Priority Data

Aug. 16, 1975 Germany ............................. 2536535

[51] Int. Cl.$^2$ ............................................. C23F 11/18
[52] U.S. Cl. ................................. 21/2.7 R; 21/2.5 R; 423/58; 252/387
[58] Field of Search ........... 252/387; 21/2.5 R, 2.7 R; 75/121; 423/55, 58; 23/301 R

[56] References Cited

U.S. PATENT DOCUMENTS

| 3,087,778 | 4/1963 | Negra et al. | 252/387 |
| 3,493,328 | 2/1970 | Nieuwenhuis | 423/58 |
| 3,615,264 | 10/1971 | Berry et al. | 252/387 |

*Primary Examiner*—Benjamin R. Padgett
*Assistant Examiner*—Irwin Gluck
*Attorney, Agent, or Firm*—Keil, Thompson & Shurtleff

[57] ABSTRACT

In order to reduce corrosion of the inside walls of a reactor made of iron or an iron alloy and used for the synthesis of chromium dioxide by hydrothermal conversion of chromium(VI) oxide with chromium oxides of lower valency, lead or bismuth is added at those points of the reactor at which an aqueous phase occurs during conversion and which do not contact the chromium oxides to be converted. The lead or bismuth may be used in metallic form or in the form of their oxides, hydroxides or salts.

3 Claims, No Drawings

REDUCING CORROSION IN REACTORS USED FOR THE SYNTHESIS OF CHROMIUM DIOXIDE

This invention relates to a method of reducing corrosion of the inside walls of a reactor used for the synthesis of chromium dioxide.

It is known to synthesize chromium dioxide by hydrothermal conversion of chromium(VI) oxide with chromium oxides of lower oxidation states, particularly $Cr_2O_3$ or $Cr_3O_8$ and $Cr_2O_5$, in the presence or absence of doping agents such as heavy metal compounds. This conversion is carried out at temperatures of from 250° to 500° C and pressures of from 50 to 500 bars. The oxide mixture is placed in unsealed cans, for example of non-alloyed carbon steel, which are stacked one above the other in a high-pressure reactor. The water necessary for the hydrothermal reaction is in the bottoms of the high-pressure reactor. To prevent the water from flooding the lowermost can, the latter may be mounted on a raised platform, which may also be of carbon steel.

The high-pressure reactors normally used for the synthesis of chromium dioxide are of iron or alloys of iron such as carbon steel, cast iron, stainless steels (nickel-chromium steels), nickel-chromium-molybdenum steels (e.g. X 10 CrNiMoTi 1810 of DIN 17,440, material 1.4571, or NiMo16Cr, material 24812 of DIN 17,440) or nickel-molybdenum-vanadium steels and similar steels, or at least their inner walls are lined with such materials. The welding alloy used is for example nickel-chromium steel such as NiCr15Fe.

During the hydrothermal reaction, carried out batchwise, the water in the reactor bottoms has a pH of from 2.0 to 2.5 at the end of the reaction and contains up to 1.0 g/l of chromium, mainly present in the form of hexavalent chromium in solution. The water also contains up to 0.6 g/l of nitrate and traces of chloride.

Particularly the aqueous phase in the reactor bottoms has a strongly corrosive action on the materials used for the manufacture of the reactor and its fittings. It has been found, for example, that the following damage occurs to the individual materials after only 500 hours of operation.

(a) Various forms of stress corrosion cracking, particularly noticeable on nickel-base materials (nickel-chromium and nickel-molybdenum-chromium alloys) and also austenitic chromium-nickel-molybdenum steels and low-alloy steels, e.g. 20 CrMoV 135, material No. 1.7779, (b) structural damage in non-alloyed carbon steels, particularly below the water level of the reactor bottoms, this damage having an appearance similar to that of attack by compressed hydrogen, and (c) marked general corrosion of all the materials showing local formation of blisters or hollows.

These results are surprising, since intercrystalline stress corrosion cracking of nickel-chromium steels has hitherto only been known to occur at temperatures above 300° C in highly pure water or slightly impure neutral water or aqueous caustic soda solution. Intercrystalline stress corrosion cracking of low-alloy steels has hitherto been unknown in media similar to those used in the present case.

The structural damage mentioned under (b) above is similar to the damage caused by the attack of hydrogen under pressure, for example as observed in the early days of ammonia synthesis.

It is an object of the present invention to provide a method of reducing corrosion of the internal walls and fittings of a reactor of iron or iron alloys used for the synthesis of chromium dioxide by hydrothermal conversion of chromium(VI) oxide with chromium oxides of lower valencies.

This object is achieved by adding lead or bismuth in metallic form or in the form of their oxides, hydroxides and/or salts to those points of the reactor at which an aqueous phase occurs during conversion, which aqueous phase does not contact the chromium oxides to be converted.

In this way, the formation of cracks in, for example, nickel-base alloys is surprisingly suppressed, although the literature states that the formation of cracks in nickel-base alloys is in fact assisted by the presense of lead (H. R. Copson, G. Economy, Corrosion (NACE) 24, 1968, pp. 55–65). Similarly, the aforementioned corrosion phenomena, i.e. stress corrosion cracking and structural damage, are at least markedly suppressed in the case of non-alloyed or low-alloyed carbon steels. There is also a decrease in the general corrosion of these steels and of the pitting phenomenon.

The method of the invention may be carried out by adding the said elements to the water required for the hydrothermal conversion, this normally being placed in the reactor bottoms. Alternatively, excess water may be placed in the cans, which water is condensed during the reaction on the colder parts of the reactor, for example the walls, and then collects in the bottoms of the reactor where the additives have been placed. In both cases the additives of the invention are present in the bottoms of the reactor.

Where lead and bismuth are added in metallic form, they are best used in the form of a powder having, for example, a particle size of from 0.1 to 1,000 μm. However, oxides or hydroxides of bismuth and divalent lead are preferred. These compounds have the advantage that they simultaneously raise the pH of the water, for example from pH 2 to values of from 5 to 6. Salts of said elements may also be used, of course, a particular example being lead(II) sulfate.

The lead and bismuth or their compounds are used in amounts such that the chromium evaporating from the interior of the cans during the hydrothermal conversion and collecting in the bottoms of the reactor is bound in the form of sparingly soluble lead or bismuth chromate. Thus lead and bismuth are placed in the base of the reactor together with the water initially placed therein or collecting therein during the reaction in amounts which are at least equivalent to the stoichiometric amount in relation to the amount of chromate collecting therein. Since the chromates of lead and bismuth are very sparingly soluble, even the dichromate present in acid solution and in equilibrium with the chromate irons is precipitated as a sparingly soluble chromate. Usually, from 100 to 200 mg of chromic acid are liberated per kg of chromium dioxide formed. This may be used as a basis for calculating the required amount of additives of the invention.

In addition to the above additives, it is possible to add hydroxides of lithium and barium in amounts causing the pH in the bottoms of the reactor to be above 7 to about 11 after the reaction.

Since the method of the invention greatly reduces corrosion not only on the relatively expensive nickel-base alloys such as austenitic alloys but also on the cheap non-alloyed or low-alloyed steels, it has the further advantage that said cheaper materials, e.g. boiler plate H II, St 35, St 45, may be used for the reactors or fittings.

EXAMPLE (A) An autoclave having a capacity of 0.9 l and an initial nitrogen pressure of 50 bars is heated 5 times to 350° C and 420 bars over a period of 250 hours. For each cycle, 400 cm$^3$ of water are filled into the autoclave, this water coming from the reactor bottoms of a chromium dioxide autoclave and having a pH of 2.0 and containing 0.5 g/l of chromium (in the form of chromate) and 0.6 g/l of NO$_3$ ions.

Before starting the autoclave for the first time, flat and U-bend specimens of
(a) boiler plate H 1
(b) St 35.2
(c) Ni-Mo-Cr alloy (material No. 2.4819)
are placed therein to test the corrosion.

The individual specimens are insulated from each other and from the wall of the autoclave by oxide-ceramic material.

The individual specimens are examined after the said 250 hours, and the findings are as follows:

(a) Flat specimens

On both specimens of boiler plate H 1 and St 35.2 there is pitting, the commencement of structural damage by hydrogen attack and 80 times the hydrogen content (rate of corrosion 0.2 mm/a, 0.5 mm/a in the pits). In the case of material St 35.2 blisters are also formed and there is structural damage in the region of the weld seam. Both the boiler plate and the material St 35.2 show distinct duplication of non-metallic inclusions as an early stage of hydrogen attack. The Ni-Cr-Mo specimen shows uniform attack, intercrystalline cracks due to the internal stresses resulting from machining of the edges of the specimen and as a result of drilling and marking of the specimen with number punches.

(b) U-bend specimens

Pitting is visible on the specimens of boiler plate H 1 and the material St 35.2, whilst the Ni-Mo-Cr alloys show numerous intercrystalline cracks over b 2/3 of the thickness of the specimen, and crack formation is observable even at low stresses considerably below the yield point (in the region of the clamp). (B) Test (A) was repeated except that 4 g of PbO were added to the water in each charge to give the following results:

All of the specimens are brownish black. The U-bend specimens show no cracks, not even under the microscope, and although the average rate of corrosion of non-alloyed steel (boiler plate H 1 and material St 35.2) is also 0.2 mm/a, it is only 0.3 mm/a in the region of the considerably shallower pits. No blister formation is seen on St 35.2. Neither boiler plate H 1 nor St 35.2 shows compressed hydrogen attack or any structural damage or duplication of the inclusions. Their hydrogen content remains constant within the usual analysis tolerances (1.2 ppm before the test, 1.5 ppm after the test).

(C) Since lead oxide (PbO) is more readily in soluble cold water than in hot water, i.e. its solubility decreases with rising temperature, the following test is carried out:

50 ml of water containing 4 g of PbO are initially placed in the autoclave described above and heated to 250° C. At this temperature, 350 ml of water are fed to the autoclave as in (A), whereupon the autoclave is heated 5 times over 250 hours to 350° C and 420° C.

The specimens show the same results as described under (B) above. This shows that the anticorrosive effect of the addition of PbO is not due to any lead chromate formed under cold conditions.

(D) Test (B) is repeated except that only one cycle is carried out over 250 hours. The same results are obtained as in the Test (B).

(E) Test (B) is repeated except that there are added, in place of 4 g of PbO,
(a) 5.0 g of lead powder
(b) 4.5 g of Bi$_2$O$_3$.

The same results are obtained.

(F) Test (B) is repeated except that only 2 cycles are carried out, each having a duration of 250 hours and 1 g of lead oxide and also 0.7 g of lithium hydroxide are added to the water coming from the bottoms of the reactor (pH about 11 as measured at room temperature). The same results are obtained as regards the prevention of crack formation and improved results are achieved as regards localized attack on non-alloyed and low-alloyed steels. The specimens show no blister formation.

We claim:

1. A method fo reducing corrosion on the inner walls and fittings of a reactor of iron or iron alloys used for the synthesis of chromium dioxide by hydrothermal conversion of chromium(VI) oxide with chromium oxides of lower oxidation states, wherein lead or bismuth in metallic form or in the form of their oxides, hydroxides and/or salts are added at those points of the reactor at which an aqueous phase occurs during the conversion, which aqueous phase does not contact the chromium oxides to be converted.

2. A method as claimed in claim 1, wherein oxides and/or hydroxides of divalent lead and/or bismuth are used.

3. A method as claimed in claim 1, wherein lithium and/or barium hydroxide are also added.

* * * * *